United States Patent
Zhou et al.

(10) Patent No.: US 9,779,672 B2
(45) Date of Patent: Oct. 3, 2017

(54) OIL PUNCTURE CONTROLLED STARTING SYSTEM FOR EFD APPARATUS AND MANUFACTURING METHOD THEREFOR

(71) Applicants: South China Normal University, Guangzhou (CN); Shenzhen Guohua Optoelectronics Co., Ltd., Shenzhen (CN); Shenzhen Guohua Optoelectronics Institute, Shenzhen (CN)

(72) Inventors: Guofu Zhou, Guangzhou (CN); Fahong Li, Guangzhou (CN); Robert Andrew Hayes, Guangzhou (CN)

(73) Assignees: South China Normal University, Guangzhou, Guangdong (CN); Shenzhen Guohua Optoelectronics Co., Ltd., Shenzhen, Guangdong (CN); Shenzhen Guohua Optoelectronics Institute, Shenzhen, Guangdong (CN)

(*) Notice: Subject to any disclaimer, the term of this patent is extended or adjusted under 35 U.S.C. 154(b) by 0 days.

(21) Appl. No.: 15/123,970

(22) PCT Filed: Mar. 6, 2014

(86) PCT No.: PCT/CN2014/072997
§ 371 (c)(1),
(2) Date: Sep. 6, 2016

(87) PCT Pub. No.: WO2015/131373
PCT Pub. Date: Sep. 11, 2015

(65) Prior Publication Data
US 2017/0162129 A1    Jun. 8, 2017

(51) Int. Cl.
G02B 1/06    (2006.01)
G09G 3/34    (2006.01)
G02B 26/00    (2006.01)

(52) U.S. Cl.
CPC .......... *G09G 3/348* (2013.01); *G02B 26/005* (2013.01)

(58) Field of Classification Search
CPC .............................. G09G 3/348; G02B 26/005
See application file for complete search history.

(56) References Cited

U.S. PATENT DOCUMENTS 7,978,400 B2 * 7/2011 Takemoto ................ G02B 3/14
359/316
8,451,525 B2    5/2013 Kaifu et al.
(Continued)

FOREIGN PATENT DOCUMENTS

| CN | 1633624 A | 6/2005 |
|---|---|---|
| CN | 101726847 A | 6/2010 |
| CN | 102012560 A | 4/2011 |

OTHER PUBLICATIONS

International Preliminary Report on Patentability, Search Report, and Written Opinion for International Application No. PCT/CN2014/072997, dated Sep. 6, 2016, 17 pages.

*Primary Examiner* — Joseph P Martinez
(74) *Attorney, Agent, or Firm* — Proskauer Rose LLP

(57) ABSTRACT

An oil puncture controlled starting system for an EFD apparatus and manufacturing method therefor, wherein the EFD display structure comprises a base arranged below a lower electrode, and the base is provided with a step, such that a first liquid has a first thickness outside the step and a second thickness on the step, which is less than the first thickness, such a thickness difference renders the first liquid on the step to be punctured by a second liquid firstly when a lower voltage is applied between a upper electrode and the lower electrode, and the first liquid is pushed by the second liquid to move from a first area to a second area.

14 Claims, 4 Drawing Sheets

(56) References Cited

U.S. PATENT DOCUMENTS

2005/0213014 A1    9/2005   Feenstra et al.
2010/0110532 A1    5/2010   Takemoto et al.
2011/0051213 A1    3/2011   Kaifu et al.

* cited by examiner

OIL PUNCTURE CONTROLLED STARTING SYSTEM FOR EFD APPARATUS AND MANUFACTURING METHOD THEREFOR

CROSS-REFERENCE TO RELATED APPLICATIONS

This application is a national stage application under 35 U.S.C. §371 of international application no. PCT/CN2014/072997, filed Mar. 6, 2014, which is hereby incorporated by reference in its entirety.

TECHNICAL FIELD

The present invention relates to an oil puncture controlled starting system for an EFD apparatus and a manufacturing method therefor, belonging to the field of EFD display technologies.

BACKGROUND

Currently, a flat display structure is generally adopted in a display unit used for displaying words, images, videos, and interaction interfaces. In this field, for example, an electro fluidic display system (Electro fluidic display system, EFD), an electrophoretic display system (Electrophoretic display system), in-plane-switching (In-Plane-Switching, IPS), an electro-osmosis display system (Electro-osmosis display system), and liquid crystal display LCD, are widely used. A part of the display structures thereinto use a reflection-type display, such as the EFD applied to electronic ink (E ink) or electronic paper. The EFD may also be called electrowetting display (Electrowetting display), and the electrowetting refers to changing the wettability of a droplet on a substrate through changing the voltage between the droplet and an insulating substrate, i.e., changing a contact angle to make the droplet be deformed and displaced. The so-called wetting refers to a process that a liquid on a solid surface is replaced by another liquid. The liquid can be spread on the solid surface, and the contact surface between the solid and the liquid tends to be expanded. That is, the adhesive power of the liquid to the solid surface is greater than the cohesive force thereof, which is wetting namely. The liquid cannot be spread on the solid surface, and the contact surface tends to be shrunk into a spherical shape, which is non-wetting namely. The non-wetting is just that the adhesive power of the liquid to the solid surface is less than the cohesive force thereof, wherein the wetting effect of a hydrophobic surface may be changed by voltage (thus named electrowetting), which enables the surface to become more hydrophilic (wetting). Because the original hydrophobic surface becomes more hydrophilic currently, the original inert liquid that is well contacted with the hydrophobic surface, such as an oil layer, has to be changed in form. This interface property control is the basis of applying the electrowetting. The application of an electrowetting display principle has been described in details in the patent application, WO03071347 and the contents published in 425383385 of the publication "Nature", which are both incorporated herein by reference.

The principle structural drawings of an EFD pixel unit structure are as shown in FIG. 1a and FIG. 1b, and a pixel wall 3 is arranged above a dielectric layer and a photoetched lower electrode 5. An insulating layer in the top layer has hydrophoby, and is thus called as a hydrophobic insulating layer 6. A first liquid 1 (such as an oil layer) has good wettability in the hydrophobic insulating layer 6, and is thus used for filling an area limited by the pixel wall 3. A second liquid 2 and the hydrophobic insulating layer 6 are not wetted, and the second liquid is incompatible with the oil layer, and fills the top of the unit structure.

When a voltage is applied to the electrode, an electric charge is accumulated in the lower surface of the second liquid 2, and then overcomes a capacitance power to puncture the oil layer. The oil layer punctured may be pushed to a corner of a pixel area through further increasing the voltage. If the voltage is eliminated, the oil compressed will return to a state before applying the voltage. As shown in FIG. 1a, the oil layer is filled in the area 1 as shown in the figure before applying the voltage; and as shown in FIG. 1b, the oil layer is pushed to one side of the pixel unit structure after applying the voltage. If proper pigment is added in the oil layer, such as black pigment, the pixel shows lightproof black while overlooking the pixel unit from the position of FIG. 1a. while the pixel is light-transmitting at the position of FIG. 1b. In case of a reflective display, the color of a reflecting layer below the pixel is presented as, for example, white.

In order to puncture the oil layer, a proper charge intensity needs to be used, which is defined as follows.

$$\rho = \varepsilon \frac{V}{d}$$

wherein, V is the voltage applied, $\varepsilon$ is a dielectric constant, and d is thickness. Due to technical effects, such as the thickness change of the dielectric layer and the filling nonuniformity of the oil layer, the charge intensity on the surface of the oil layer may be different, which will cause the following problems.

1) The puncture points of the oil layers having different pixels may be different; and 2) The movement of the oil layer punctured in this way cannot be predicted.

The problems above will bring defects during the working time of the EFD apparatus, which is not expected to be seen by a user.

In addition, the existing pixel design has a severe problem of hysteresis effect, which is as shown in FIG. 2. A horizontal axis refers to the voltage V applied, while a vertical axis refers to the pixel area opened. The voltage applied is increased from a zero point O to a threshold voltage Vth (threshold point A in FIG. 2), so that the oil layer is punctured by the second liquid 2. After the oil layer is punctured, the shrinking of the oil in the pixel is very sensitive to the voltage applied, which makes it very difficult to modulate the area opened. When the voltage applied exceeds a certain numerical value, the area opened becomes saturated (a saturation point B in FIG. 2). If the voltage applied is decreased, then the opened area of the pixel is decreased following different routes (as a cutoff route BCO shown in FIG. 2), which is the so-called hysteresis effect. However, a smaller hysteresis effect in the EFD display apparatus is usually expected, so that a pixel gray scale (which is corresponding to the size of the opened area of the pixel in proportion) may be easily modulated through applying the voltage.

SUMMARY

The object of the present invention is to overcome the defects of the prior art, and provide a display structure having a high-brightness diffuse reflector and a manufacturing method therefor.

In order to achieve the object above, the following technical solutions are used in the present invention.

According to one aspect of the present invention, an oil puncture controlled starting system for an EFD apparatus is provided. The oil puncture controlled starting system comprises an EFD display structure. The EFD display structure comprises an upper electrode arranged in a top portion of the EFD display structure, a lower electrode arranged in a bottom portion of the EFD display structure, a dielectric layer arranged on the lower electrode, and a pixel wall with different heights arranged on the dielectric layer. The structure further comprises a first liquid filled in the area limited by the pixel wall, and a second liquid filled between the first liquid and the upper electrode. The dielectric layer comprises a hydrophobic insulating layer, the first liquid and the hydrophobic insulating layer are configured to have sufficient wettability, so that the first liquid is contacted with the hydrophobic insulating layer and completely covers the hydrophobic insulating layer under a closed state that no voltage is applied between the upper electrode and the lower electrode. The pixel wall with different heights comprise a higher pixel wall portion with a first height located in a first area of the EFD display structure, and a lower pixel wall portion with a height lower than the first height, located in a second area of the EFD display structure.

In terms of height, the lower pixel wall is configured to enable the first liquid in the second area to be punctured firstly when a preset lower voltage is applied between the upper electrode and the lower electrode.

Preferably, the structure further comprises a base arranged below the lower electrode, the base is provided with a step on a portion thereof in the second area, so that the portions of the lower electrode and the dielectric layer located on the step are higher than the portions of same outside the step, such that a second thickness of the first liquid on the step is less than a first thickness of same outside the step.

Preferably, the thickness difference between the second thickness and the first thickness of the first liquid is set to enable the first liquid on the step to be punctured by the second liquid firstly when a lower voltage is applied between the upper electrode and the lower electrode, and the first liquid is pushed by the second liquid to move from the second area to the first area.

Preferably, the base is provided with a plurality of steps on the portion thereof in the second area, and the vertical height of the step that is further away from the first area is greater than the vertical height of the step that is closer to the first area.

Preferably, the first liquid is an inert liquid which comprises a tinctorial oil layer.

Preferably, the structure further comprises a hydrophillic layer arranged between the upper electrode and the second liquid.

According to another aspect of the present invention, an EFD display apparatus is provided, which comprises a plurality of EFD pixel units each having the oil puncture controlled starting system described above, wherein the orientations of the first area and the second area in the oil puncture controlled starting system in each of the EFD pixel unit are consistent.

According to yet another aspect of the present invention, an oil puncture controlled starting method for an EFD apparatus is provided, comprising the following steps:

providing an EFD display structure in an oil puncture controlled starting system;

providing a base in the EFD display structure, and forming a step on the base to enable the step to be higher than the base area outside the step;

forming a lower electrode on the base and coating a dielectric layer, such that the vertical heights of the portions of the lower electrode and the dielectric layer on the step are higher than that of the portions thereof outside the step, wherein the dielectric layer is configured to comprise a hydrophobic insulating layer;

forming a pixel wall with different heights on the periphery of the dielectric layer using a photolithography technique, wherein the pixel wall with different heights comprise a lower pixel wall portion on the step and a higher pixel wall portion outside the step;

filling a first liquid in the pixel wall, wherein the first liquid outside the step has a first thickness and on the step a second thickness which is less than the first thickness; and arranging an upper electrode above the pixel wall, and filling a second liquid between the upper electrode and the pixel wall.

Preferably, the thickness difference between the second thickness and the first thickness is set to enable the first liquid on the step to be punctured by the second liquid firstly when a lower voltage is applied between the upper electrode and the lower electrode, and the first liquid is pushed by the second liquid to move from an area above the step to an area outside the step.

Compared with the prior art, the present invention has the obvious advantages and beneficial effects as follows:

According to the oil puncture controlled starting system for an EFD apparatus and the manufacturing method therefor of the present invention, firstly, in the EFD pixel unit, the oil layer, which is the inert liquid, has a puncture point located in an required ideal area, less effected by too much or too little filling of the oil layer. In the EFD display apparatus consisting of a plurality of such pixel units, the puncture point of the oil layer of each pixel unit is in the same area. Therefore, the movement orientations and characteristics of the oil layer of each pixel are consistent. Secondly, only a lower potential difference is needed to puncture the oil layer. Therefore, the hysteresis effect is relieved. This enables the gray scale of the pixel to be controlled easily. Therefore, the display effect of the EFD display apparatus is greatly improved as a whole.

BRIEF DESCRIPTION OF THE DRAWINGS

The present invention will be described in details thereinafter by the embodiments with reference to the drawings.

DETAILED DESCRIPTION

Figure 3:
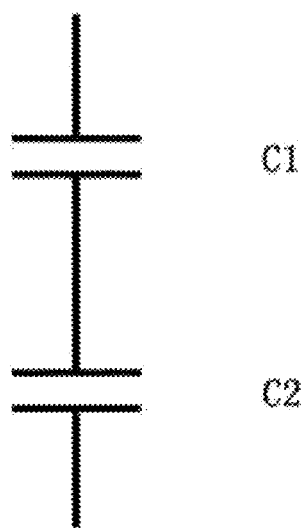
FIG. 3 is a principle diagram illustrating electrical expression of the existing EFD display structure.

As shown in FIG. 3, in an existing EFD pixel design, the heights of the pixel wall 3 are homogeneous, this makes operation of the pixels relatively sensitive to the described defect of the existing EFD display structure, for example, inconsistent movement directions of an oil layer and hysteresis effects. From the aspect of electricity, one EFD pixel may be regarded as a combination of two capacitances: C1 is the capacitance of a first liquid (for example, an oil layer) representing an inert liquid, and C2 is the capacitance of a dielectric layer representing a dielectric layer. Therefore, the total capacitance C=C1*C2/(C1+C2), and the charge accumulated in an interface is in proportion to the total capacitance. Hereinafter this principle will be used in the present invention to manufacture a novel structure of pixel walls 3, and solve the problems described above.

Figure 1A:
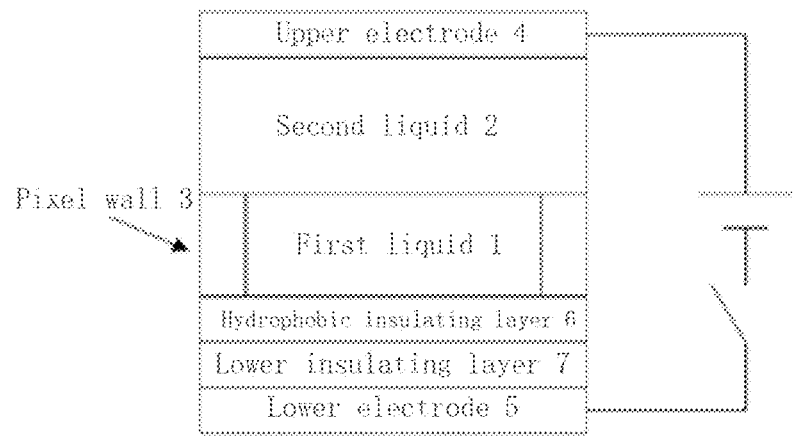
FIG. 1a is a principle diagram when no voltage is applied between upper and lower electrodes of an existing EFD display structure.
Figure 1B:
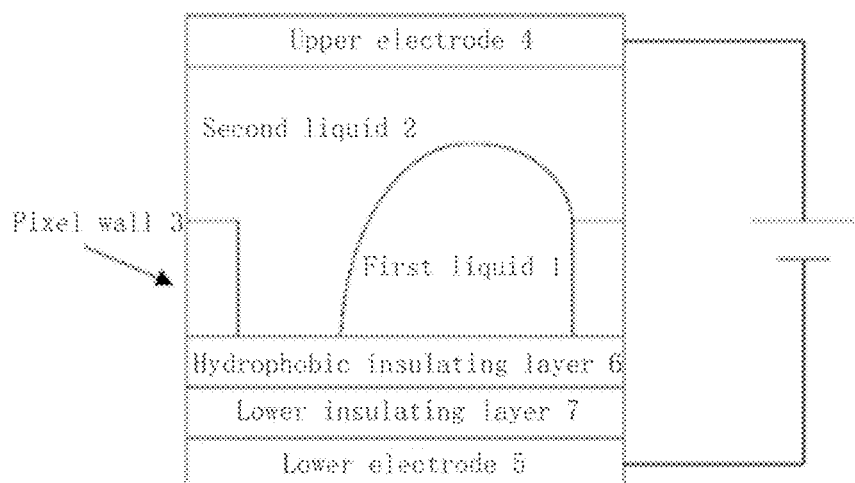
FIG. 1b is a principle diagram after a voltage is applied between the upper and lower electrodes of the existing EFD display structure.
Figure 2:
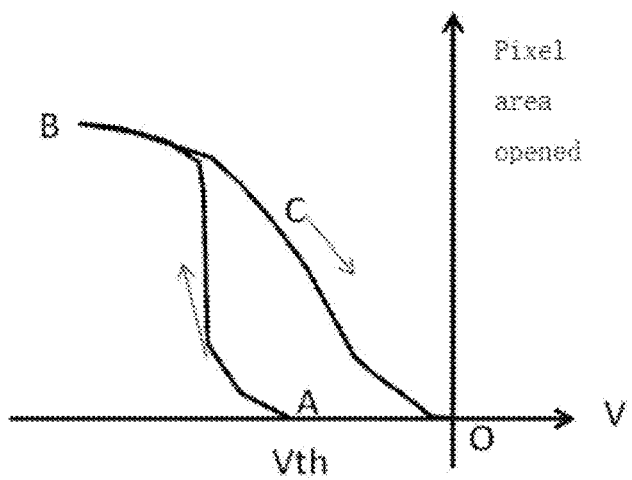
FIG. 2 is a principle diagram illustrating a hysteresis effect of the existing EFD display structure.
Figure 4A:
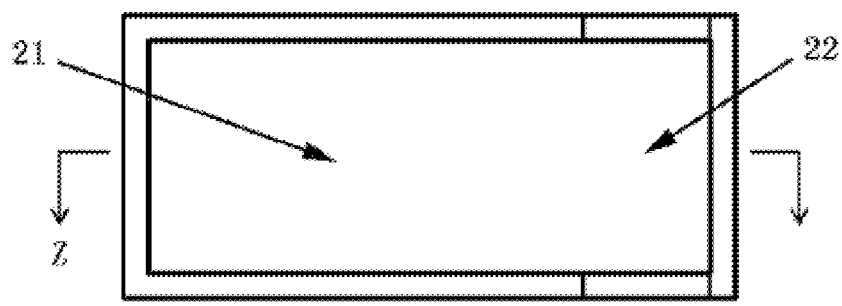
FIG. 4a is a top view of an EFD display structure having pixel walls with different heights according to an embodiment of the present invention.
Figure 4B:
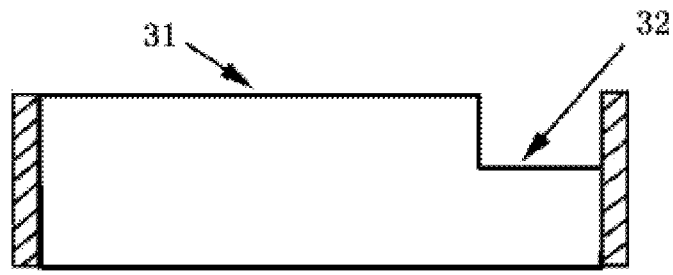
FIG. 4b is a side view of a section of the EFD display structure having pixel walls with different heights along a Z direction in FIG. 4a according to an embodiment of the present invention.
Figure 5:
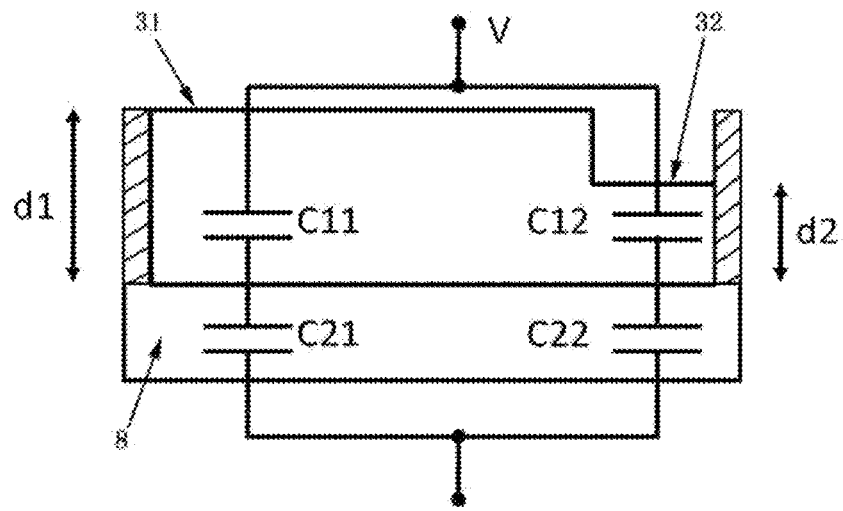
FIG. 5 is a principle diagram illustrating a capacitance property in the EFD display structure having pixel walls with different heights according to an embodiment of the present invention.
Figure 6:
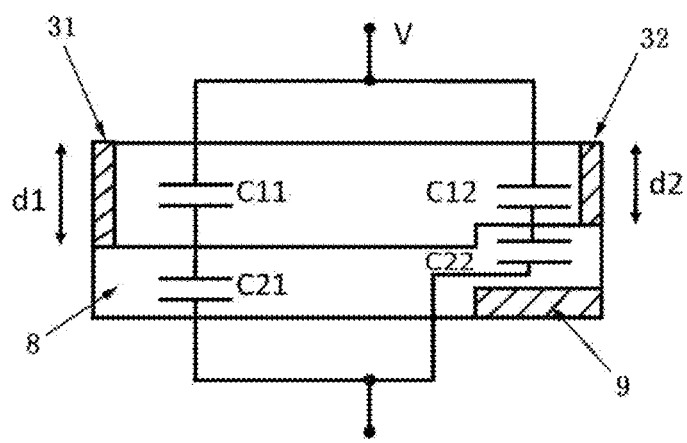
FIG. 6 is a principle diagram illustrating a capacitance property in an EFD display structure having pixel walls with different heights according to another embodiment of the present invention.

FIGS. 4a and 4b show an EFD display structure of pixel walls 3 with different heights according to an embodiment of the present invention, wherein the structure is improved based on the structure as shown in FIG. 1a. Similar to the structure shown in FIG. 1a, the structure according to the invention may also comprise an upper electrode 4 arranged in a top portion of the EFD display structure, a lower electrode 5 arranged in a bottom portion of the EFD display structure, a dielectric layer arranged on the lower electrode 5, and a pixel wall 3 arranged on the dielectric layer. According to the present invention, the dielectric layer may comprise one or more layers of dielectric substances which form a capacitor with the upper and lower electrodes 4 and 5 in electricity. A first liquid 1, such as a tinctorial oil layer, belonging to an inert liquid, is filled in the area limited by the pixel wall 3, and a second liquid 2, including but is not limited to water and an aqueous electrolyte solution, or other non-aqueous liquid, is filled between the first liquid 1 and the upper electrode 4. When no voltage is applied between the upper and lower electrodes 4 and 5, the second liquid 2 and a hydrophobic insulating layer 6 are not wetted. In the exemplary embodiments as shown in FIGS. 5 and 6, the dielectric layer comprises a lower insulating layer 7 and a hydrophobic insulating layer 6. In other feasible embodiments, the dielectric layer may comprise the hydrophobic insulating layer 6 only. The oil layer and the hydrophobic insulating layer 6 have sufficient wettability, so that the oil layer is contacted with the hydrophobic insulating layer 6 and completely covers the hydrophobic insulating layer 6 under a closed state where no voltage is applied between the upper electrode 4 and the lower electrode 5. According to the embodiment, the pixel wall 3 has different heights, specifically, the pixel wall 3 has a higher pixel wall portion 31 with a first height, located in a first area 21 of the EFD display structure, and a lower pixel wall portion 32 with a height lower than the first height, located in a second area 22 of the EFD display structure.

In particular, in terms of height, the lower pixel wall portion 32 is configured to enable the oil layer in the second area 22 to be punctured by the second liquid 2 firstly when a preset lower voltage is applied between the upper electrode 4 and the lower electrode 5.

In this way, the capacitor structure in the EFD pixel is changed, as shown in FIG. 5. In the embodiment, C11 and C12 are the capacitances of the first liquid 1 located in the first area and the second area, respectively, and C21 and C22 are the capacitances of the dielectric layer, wherein, C21=C22, in a theoretical electronic model.

A charge intensity $\rho_1$ in the first area 21, where the higher pixel wall portion 31 is located, is derived through the following formula:

$$\rho_1 = \frac{\varepsilon_0 \varepsilon_1}{\varepsilon_1 d_0 + \varepsilon_0 d_1} V$$

wherein V is the voltage applied, $\varepsilon_0$ is the dielectric constant of the dielectric layer, $\varepsilon_1$ is the dielectric constant of the oil layer, $d_0$ is the height of the dielectric layer, and $d_1$ is the height of the higher pixel wall portion 31, such as the first height.

Moreover, a charge intensity $\rho_2$ in the second area 22, where the lower pixel wall portion 32 is located, is derived through a following formula, wherein $d_2$ is the height of the lower pixel wall portion 32:

$$\rho_2 = \frac{\varepsilon_0 \varepsilon_1}{\varepsilon_1 d_0 + \varepsilon_0 d_2} V$$

Because the height $d_2$ of the lower pixel wall portion 32 is lower, the charge intensity corresponding to the second area 22 is higher. Therefore, it may be predicted that, the oil layer in the second area 22 is punctured by the second liquid 2 firstly through a relatively lower potential difference applied. In this way, it may be predicted that all pixels in the EFD apparatus are punctured in the same area, and thus it may be predicted that the oil layer uniformly moves to the first area 21, where the higher pixel wall portion 31 is located, during this operation of the apparatus.

The EFD display apparatus comprises a plurality of EFD pixel units each having the oil puncture controlled starting system, and the orientations of the first area 21 and the second area 22 in the oil puncture controlled starting system in each of the EFD pixel unit are consistent according to the invention.

The structure comprising the pixel wall 3 with different heights according to the present invention can be implemented conveniently using an existing manufacturing process.

According to another embodiment of the present invention, as shown in FIG. 6, the structure further comprises a base arranged below the lower electrode 5. The base is provided with a step 9 on a portion thereof in the second area 22, so that portions of the lower electrode 5 and the dielectric layer on the step 9 are higher than portions of same outside the step 9, such that the oil layer has a first thickness outside the step 9, and a second thickness on the step 9, which is less than the first thickness. Optionally, the step 9 may not be formed under the pixel wall. If that is the case, pixel wall 31 and 32 can have the same height.

In the embodiment, the lower pixel wall portion 32 and the higher pixel wall portion 31 are configured to have flush tops, to facilitate the implementation of subsequent techniques.

Preferably, the thickness difference between the second thickness and the first thickness of the oil layer is set to enable the oil layer on the step 9 to be punctured by the second liquid 2 first when a preset lower voltage is applied between the upper electrode 4 and the lower electrode 5, and the oil layer is pushed by the second liquid 2 to move from the second area 22 to the first area 21.

Preferably, the base is provided with a plurality of steps 9 on a portion thereof in the second area 22, and the vertical height of the step 9 that is further away from the first area 21 is greater than the vertical height of the step 9 that is closer to the first area 21. In this way, the movement characteristics of the oil layer will be smoother, and a display gray scale will be modulated easily.

Preferably, the structure is further comprises a hydrophillic layer arranged between the upper electrode 4 and the second liquid 2.

In the embodiment, a step 9 is provided on the base first, and then the electrode is formed and the dielectric layer is coated subsequently. Finally, a pixel wall 3 is formed by a photolithography technique. With regard to the movement of puncturing and controlling the oil layer, the structure in FIG. 6 has similar effects to it in FIG. 5.

According to the principle of the present invention, the pixel wall 3 with different heights can be constructed by different techniques. In the second area 22 where the lower pixel height occurs, the charge intensity is higher. Therefore, the oil layer in the second area 22 is punctured firstly when a relatively lower potential difference is applied.

According to yet another embodiment of the present invention, an oil puncture controlled starting method for an EFD apparatus is provided. The method comprises the following steps:

providing an EFD display structure in the oil puncture controlled starting system; in the EFD display structure, providing a base, and forming a step 9 on the base, such that the step 9 is higher than the area outside the step 9;

forming a lower electrode 5 on the base and coating a dielectric layer, such that the vertical heights of the portions of the lower electrode 5 and the dielectric layer on the step 9 are higher than that of the portions of same outside the step 9, wherein the dielectric layer is configured to comprise an insulating layer and a hydrophobic insulating layer 6;

further, using the existing technique to make the thickness of the portion of the insulating layer of the dielectric layer on the step 9 be very close to the thickness of the portion of same outside the step 9, so that both the portions of the insulating layer located on the step 9 and outside the step 9 may have approximately equal capacitance values in the aspect of electrical properties;

forming a pixel wall 3 on the periphery of the dielectric layer using a photolithography technique, wherein the pixel wall 3 has different heights, in particular the pixel walls 3 has a lower pixel wall portion 32 on the step 9 and a higher pixel wall portion 31 outside the step 9; alternatively, forming the lower pixel wall portion 32 and the higher pixel wall portion 31 with flush tops to facilitate the implementation of a subsequent technique, such that the size of the lower pixel wall portion 32 will be smaller than the higher pixel wall portion 31 in a vertical direction;

filling an oil layer in the pixel wall 3, wherein the oil layer has a first thickness outside the step 9 and a second thickness on the step 9, which is less than the first thickness; and forming an upper electrode 4 above the pixel wall 3, and filling a second liquid 2 between the upper electrode 4 and the pixel wall 5.

Preferably, the thickness difference between the second thickness and the first thickness is set to enable the oil layer on the step 9 to be punctured by the second liquid 2 firstly when a preset lower voltage is applied between the upper electrode 4 and the lower electrode 5, and the oil layer is pushed by the second liquid 2 to move from an area above the step 9 to an area outside the step 9.

The embodiments described above are used for exemplarily describing the present invention only, which does not exclude other different structures, for example, in the EFD pixel the step 9 may vary in heights by means of multiple levels. According to the prior art, in some embodiments the height of the pixel wall 3 may be set to be consistent relative to the bottom of the base, i.e., the top of the pixel wall 3 is flush, so that the first liquid 1 has different thicknesses on each step 9. In some other embodiments, the pixel wall 3 may be configured to have the same from the bottom thereof, so that the first liquid 1 may also have different thicknesses on each step 9, to achieve the technical effects of the present invention.

The descriptions above are preferred embodiments of the present invention merely, but the present invention is not limited to the embodiments above, and any technical effects of the present invention implemented using the same ways shall all fall within the protection scope of the present invention. In the protection scope of the present invention, the technical solutions thereof and/or the embodiments may have various modifications and variations. Even if individual technical characteristics are cited in different claims, the present invention may also comprise an embodiment co-owning these characteristics.

The invention claimed is:

1. An oil puncture controlled starting system for an EFD apparatus, comprising an EFD display structure, said EFD display structure comprising:
    an upper electrode arranged in a top portion of the EFD display structure;
    a lower electrode arranged in a bottom portion of the EFD display structure;
    a dielectric layer comprising a hydrophobic insulating layer and arranged on the lower electrode;
    a pixel wall with different heights arranged on the dielectric layer, and comprising a higher pixel wall portion with a first height located in a first area of the EFD display structure, and a lower pixel wall portion with a height lower than the first height, located in a second area of the EFD display structure;
    a first liquid filled in an area limited by the pixel wall;
    a second liquid filled between the first liquid and the upper electrode;
    wherein, the first liquid and the hydrophobic insulating layer are configured to have sufficient wettability, such that the first liquid is contacted with the hydrophobic insulating layer and completely covers the hydrophobic insulating layer under a closed state that no voltage is applied between the upper electrode and the lower electrode, and the height of the lower pixel wall portion is configured to render the first liquid in the second area to be punctured firstly when a preset lower voltage is applied between the upper electrode and the lower electrode.

2. The oil puncture controlled starting system for an EFD apparatus according to claim 1, wherein said EFD display structure further comprises a base arranged below the lower electrode, wherein the base is provided with a step on a portion thereof in the second area, such that portions of the lower electrode and the dielectric layer located on the step are higher than portions of same outside the step, such that the first liquid has a first thickness outside the step and a second thickness on the step, which is less than the first thickness.

3. The oil puncture controlled starting system for an EFD apparatus according to claim 2, wherein the thickness difference between the second thickness and the first thickness of the first liquid is configured to render the first liquid on the step to be punctured by the second liquid firstly when a lower voltage is applied between the upper electrode and the lower electrode, and the first liquid is pushed by the second liquid to move from the second area to the first area.

4. The oil puncture controlled starting system for an EFD apparatus according to claim 2, wherein the base is provided with a plurality of steps on the portion thereof in the second area, and the vertical height of the step further away from the first area is greater than the vertical height of the step closer to the first area.

5. The oil puncture controlled starting system for an EFD apparatus according to claim 1, wherein the first liquid is an inert liquid comprising a tinctorial oil layer.

6. The oil puncture controlled starting system for an EFD apparatus according to claim 1, wherein the EFD display structure further comprises a hydrophillic layer arranged between the upper electrode and the second liquid.

7. An EFD display apparatus, comprising a plurality of EFD pixel units having the oil puncture controlled starting system according to claim 1, wherein the orientations of the first area and the second area in the oil puncture controlled starting system in each of the EFD pixel unit are consistent.

8. An EFD display apparatus, comprising a plurality of EFD pixel units having the oil puncture controlled starting system according to claim 2, wherein the orientations of the first area and the second area in the oil puncture controlled starting system in each of the EFD pixel unit are consistent.

9. An EFD display apparatus, comprising a plurality of EFD pixel units having the oil puncture controlled starting system according to claim 3, wherein the orientations of the first area and the second area in the oil puncture controlled starting system in each of the EFD pixel unit are consistent.

10. An EFD display apparatus, comprising a plurality of EFD pixel units having the oil puncture controlled starting system according to claim 4, wherein the orientations of the first area and the second area in the oil puncture controlled starting system in each of the EFD pixel unit are consistent.

11. An EFD display apparatus, comprising a plurality of EFD pixel units having the oil puncture controlled starting system according to claim 5, wherein the orientations of the first area and the second area in the oil puncture controlled starting system in each of the EFD pixel unit are consistent.

12. An EFD display apparatus, comprising a plurality of EFD pixel units having the oil puncture controlled starting system according to claim 6, wherein the orientations of the first area and the second area in the oil puncture controlled starting system in each of the EFD pixel unit are consistent.

13. An oil puncture controlled starting method for an EFD apparatus, comprising the following steps of:
  providing an EFD display structure in an oil puncture controlled starting system;
  providing a base in the EFD display structure, and on the base forming a step which is higher than the portion of the base outside the step;
  forming a lower electrode on the base and coating a dielectric layer such that the vertical heights of the portions of the lower electrode and the dielectric layer on the step are higher than that of the portions thereof outside the step, wherein the dielectric layer is configured to comprise a hydrophobic insulating layer;
  forming a pixel wall with different heights on the periphery of the dielectric layer using a photolithography technique, wherein the pixel wall comprise a lower pixel wall portion on the step and a higher pixel wall portion outside the step;
  filling a first liquid in the pixel wall, wherein the first liquid has a first thickness outside the step and a second thickness on the step, which is less than the first thickness;
  providing an upper electrode above the pixel walls, and filling a second liquid between the upper electrode and the pixel walls.

14. The oil puncture controlled starting method for an EFD apparatus according to claim 13, wherein the thickness difference between the second thickness and the first thickness is configured to render the first liquid on the step to be punctured by the second liquid firstly when a lower voltage is applied between the upper electrode and the lower electrode, and the first liquid is pushed by the second liquid to move from an area above the step to an area outside the step.

* * * * *